United States Patent [19]

Reiger, Jr.

[11] 4,000,764
[45] Jan. 4, 1977

[54] STATOR LEAD TERMINATION APPARATUS

[75] Inventor: Arthur C. Reiger, Jr., Dayton, Ohio

[73] Assignee: The Globe Tool and Engineering Company, Dayton, Ohio

[22] Filed: Mar. 27, 1975

[21] Appl. No.: 562,861

[52] U.S. Cl. ............................. 140/113; 140/124; 242/7.11; 242/7.17
[51] Int. Cl.² .................... B21F 15/00; B21F 3/02
[58] Field of Search ...... 29/203 B, 203 D, 203 DT, 29/203 MW; 140/93 R, 113, 122, 124, 115; 242/7.06, 7.11, 7.17, 7.18

[56] References Cited

UNITED STATES PATENTS

| 2,855,159 | 10/1958 | Mallina | 242/7.18 |
|---|---|---|---|
| 2,884,210 | 4/1959 | Strauss | 242/7.06 |
| 3,122,826 | 3/1964 | Self | 242/7.17 |
| 3,402,629 | 9/1968 | Gebbia | 140/124 X |
| 3,443,606 | 5/1969 | Atkinson | 242/7.17 |
| 3,552,452 | 1/1971 | Stigall | 140/124 |
| 3,747,187 | 7/1973 | Colwell | 29/203 D |
| 3,866,846 | 2/1975 | Dorsey | 242/7.06 |
| 3,903,935 | 9/1975 | Boothby | 140/124 |
| R26,791 | 2/1970 | Etchison et al. | 140/124 X |

Primary Examiner—C.W. Lanham
Assistant Examiner—E. M. Combs
Attorney, Agent, or Firm—Dybvig & Dybvig

[57] ABSTRACT

Lead wires from the field coils of a two-coil, two-pole stator for a motor of the universal type are wound about posts projecting outwardly from a wire retainer mounted to the stator by means of cannulas encircling said posts and having hook portions for engaging the coil lead wires. Lead support means support leads emanating from already wound field coils at positions adjacent said posts, there being four posts and four cannulas, each telescopically encircling one of said posts. Drive means simultaneously rotate all four cannulas in directions appropriate to cause the hook portions thereon to engage the four leads emanating from the two coils and continued rotation of the cannulas causes the hook portions thereon to wind the lead wires about the posts as the lead support means permits the lead wires to be drawn therethrough while maintaining the lead wires under tension as they are wound about the posts.

4 Claims, 13 Drawing Figures

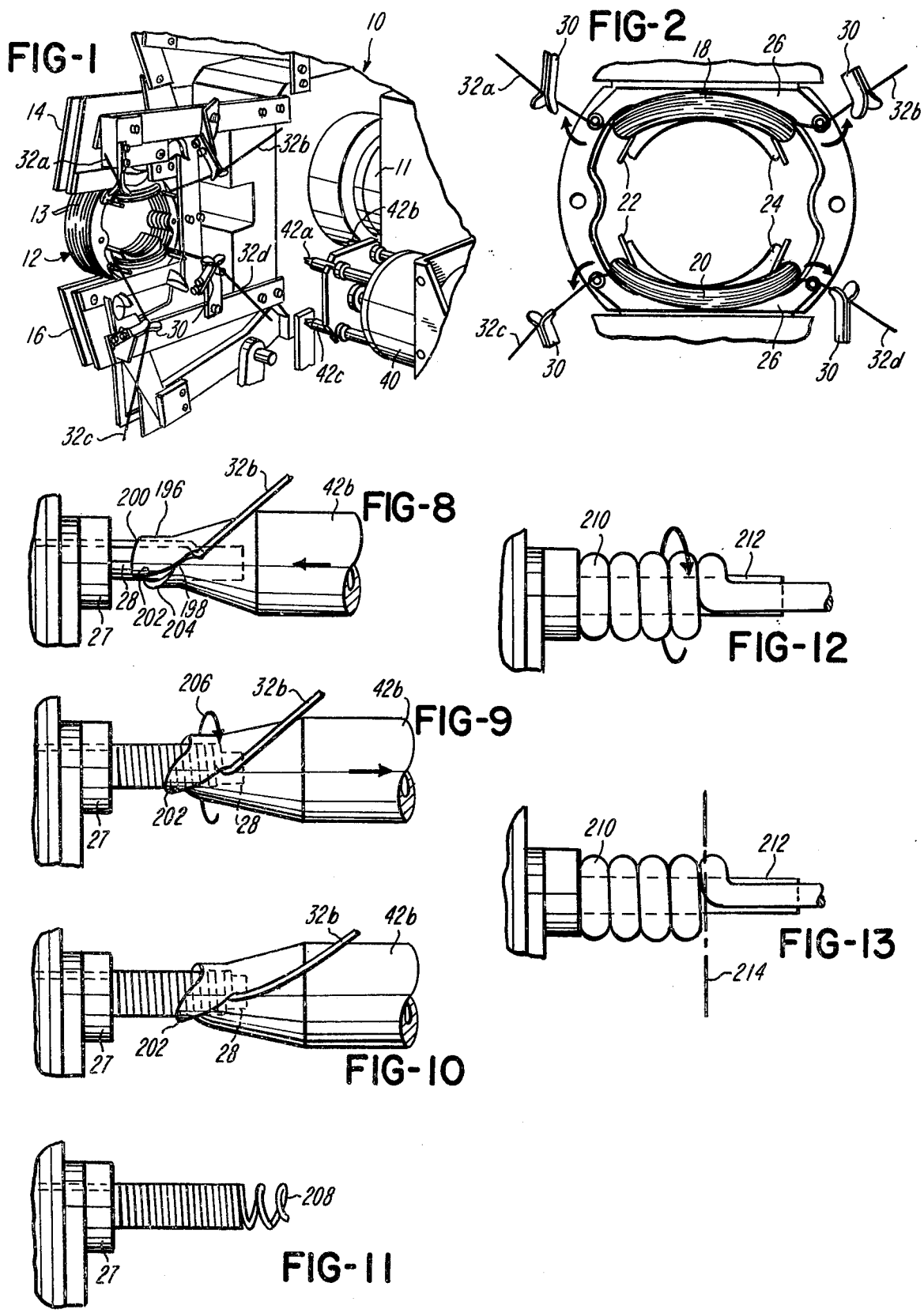

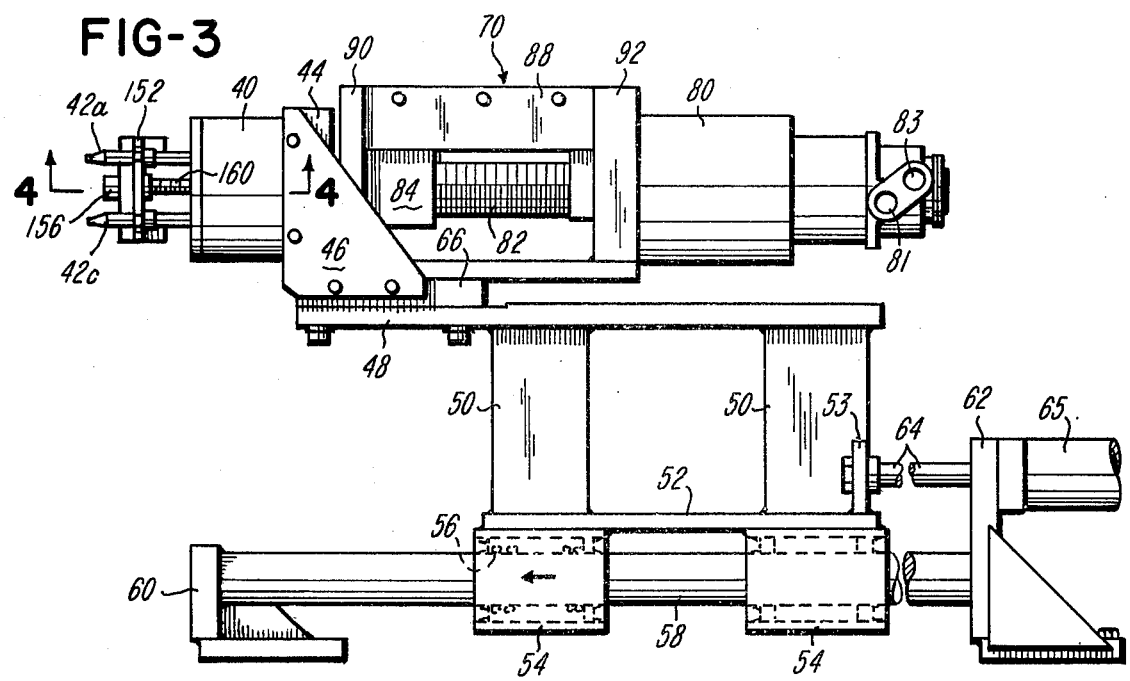
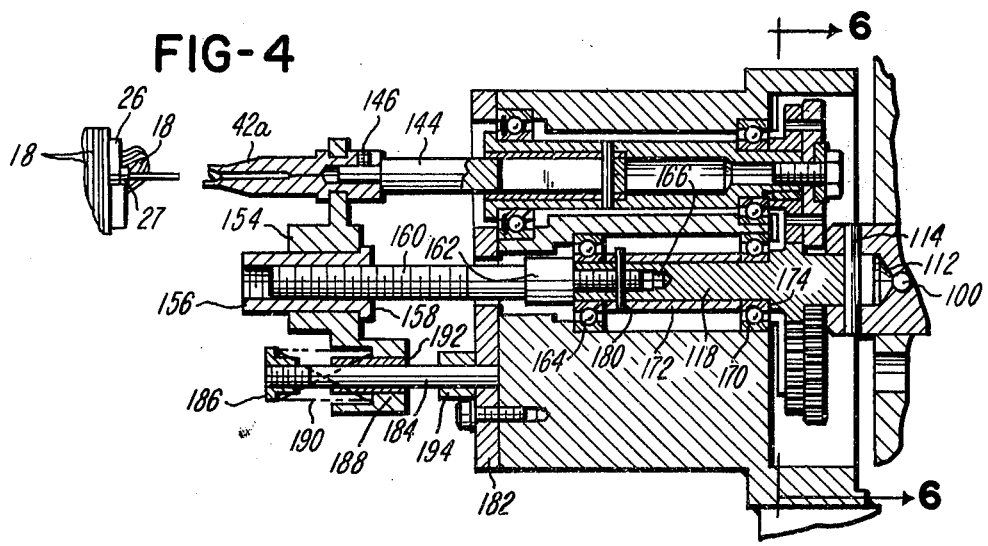

STATOR LEAD TERMINATION APPARATUS

BACKGROUND OF THE INVENTION

1. Field of the Invention

This invention relates to a method and apparatus for terminating the wire leads emanating from the field coils of a wound stator for an electric motor. More particularly, the invention relates to a method and apparatus for anchoring the leads to retainer members which support the leads so that the field coils cannot dewind or loosen and which also support the leads at a conveniently accessible position for making electrical connections thereto.

2. Description of the Prior Art

Prior art lead termination techniques applicable to the stators of electric motors appear in the following U.S. Pat. Nos. 3,331,562, 3,725,707, 3,555,316, 3,780,323, 3,551,713, 3,861,026, 3,551,715 Reissued Patent 25,281.

The foregoing patents illustrate various techniques such as crimping, clamping and encapsulation for anchoring the lead wires emanating from wound field coils in a fashion that will prevent loosening or dewinding of the coil and will render the lead terminations accessible for making electrical connections to the lead terminations.

SUMMARY OF THE PRESENT INVENTION

In the present invention the manner of accomplishing a lead termination has been simplified and rendered particularly suitable for automated processes by the placement of wire retainers adjacent the stator core, such wire retainers having posts projecting therefrom, by supporting the lead wires emanating from wound stator coils in positions at which the wires pass closely adjacent the aforementioned posts, by passing hollow needles or cannulas telescopically over the posts, such cannulas having hook portions for engaging the wires passing closely adjacent the posts and by rotating the cannulas in appropriate directions to cause the hook portions thereon to engage the wires and with continued rotation to wrap or wind the wires about the posts.

BRIEF DESCRIPTION OF THE DRAWINGS

In the drawings:

FIG. 1 is a fragmentary perspective view illustrating the support of a stator and lead wires emanating therefrom preliminarily to lead termination in accordance with the present invention.

FIG. 2 is an enlarged fragmentary elevation view further illustrating the stator prior to lead termination in accordance with the present invention.

FIG. 3 is a fragmentary elevation view with portions broken away of apparatus utilized in producing lead termination in accordance with the present invention.

FIG. 4 is an enlarged fragmentary section view taken in the direction of the line 4—4 of FIG. 3.

FIG. 8 is a fragmentary elevation view illustrating the manner in which hollow needles or cannulas wind lead termination wires in accordance with the present invention.

FIG. 9 illustrates the manner of winding termination wires at a later stage.

FIG. 10 illustrates the winding of lead termination wires at a still later stage.

FIG. 11 is a fragmentary elevation view illustrating a fully wound termination winding.

FIG. 12 illustrates a modification in which the termination wire is of greater diameter.

FIG. 13 schematically shows a cutting operation performed on the modification.

DETAILED DESCRIPTION OF THE PREFERRED EMBODIMENTS

Figure 5:
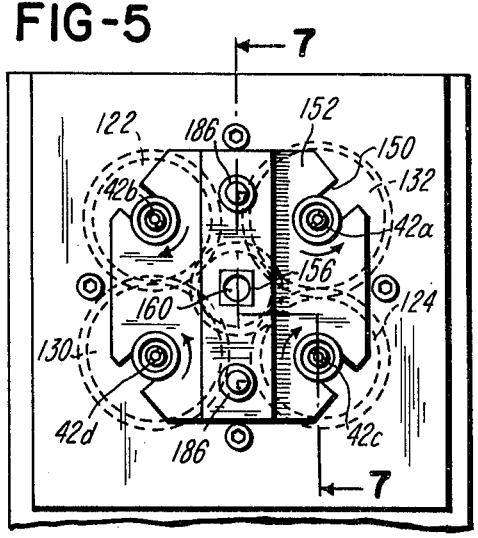
FIG. 5 is a fragmentary end elevation view of the lead termination mechanism of FIG. 3.

FIG. 1 fragmentarily illustrates one stage of a multistage production line for producing stators for electric motors. The structure fragmentarily illustrated comprises a turret mechanism 10 which is indexed about the axis of a shaft 11. The turret mechanism 10 includes jaws 14 and 16 between which a stator 12 having field coils 18 and 20 already wound thereon is supported. The body of the stator can be seen to comprise laminated plates 13 which produce an annular flux-carrying body. At the production stage illustrated, the stator 12 is only partially complete and lacks terminal connections by which electrical energy would ordinarily be supplied to the field coils.

As appears in FIG. 2, a number of operations leading toward completion of the stator have already been performed. Thus the field coils 18 and 20 have already been wound, and before such coils were wound conventional insulators 22 were inserted in slots formed between the annular body of the stator and inwardly projecting pole members 24, the coils 18 and 20 having been laid into said slots and wound over the insulators 22. Also, in a preceding manufacturing step, insulating elements 26 were mounted between the insulators 22 so as to be supported by the stator in face-contacting relation to the outermost laminated plate 13 comprising the body of the stator 12. It will be noted that the elements 26 lie adjacent the pole pieces 24 in the body of the stator. The insulating pieces 26 are preferably molded plastic pieces and were molded so as to have upstanding sockets 27 projecting therefrom. As best shown in FIG. 8, the sockets 27 project outwardly from the pieces 26 in a direction generally perpendicular to and outwardly from the body of the stator 12. Prior to the time the coils 18 and 20 were wound, metal posts 28 were press-fitted into the sockets 27 so as to also project normal to and outwardly from the body of the stator. The posts 28, which will serve as wire retainers in accordance with the present invention, are each insulated from the body of the stator by a thickness of the plastic piece 26 underlying the socket 27 into which the post has been press-fitted.

Also, in a prior production stage, after the coils 18 and 20 were wound, start and finish leads 32a, 32b, 32c and 32d to the coils were gripped by suitable clamps 30 as shown in FIGS. 1 and 2. In such prior operating stage, the two ends of the single wires forming each of the coils 18 and 20 were cut a convenient space from each of the clamps 30 to produce the wire configuration illustrated in FIGS. 1 and 2.

It can be seen that the clamps 30 are so positioned with respect to the posts 28 that the start and finish wires or leads of each of the coils 18 and 20 bear outwardly against a post 28.

The present invention is concerned with a manner in which the start and finish leads from the coils 18 and 20 can be attached to the posts 28 adjacent thereto with a minimum of physical labor and a maximum of production reliability.

As appears in FIG. 1, a cylindrical housing 40 supports a mechanism including four hollow needles, herein termed cannulas, only three of which labeled 42a, 42b and 42c appear in FIG. 1. The needles are arranged in a rectangular array, and the fourth needle does not appear because concealed by the housing 40. The housing 40 is so supported that the housing 40 can be advanced to the left as it appears in FIG. 1 to advance the four cannulas projecting therefrom to positions in which the cannulas fit telescopically over the aforementioned posts 28 in the manner appearing in FIG. 8.

The housing 40 and numerous elements associated therewith are more particularly illustrated in FIGS. 3 through 7. Referring to FIG. 3, the housing 40 has an enlarged wall portion 44 disposed to the right of the housing 40 as it appears in FIG. 3. This enlarged wall portion 44, which may be rectangular, is mounted by means of a gusset plate 46 to a frame portion 48. Spaced from the frame portion 48 by spacer bars 50 is a parallel frame member 52 to which cylinders 54 interiorly lined with ballbearings 56 have been affixed as by welding. The cylinders 54 are coaxially disposed in pairs (only one pair visible in the drawings) to receive ballbearing rods 58 (only one rod appearing in the drawings) passing through the cylinders 54 and cooperating with the cylinders to confine the aforementioned ballbearings 56.

The rods 58 are fixedly mounted between supporting plates 60 and 62, which cooperate with the rods 58 to form a stationary support assembly for the frame member 48 and 52, which can be described as a movable carriage.

As is well known, the ballbearings 56 permit the carriage to slide axially along the rods 58 with a minimum of friction.

Welded to the frame member 52 is a plate 53 which has been apertured to receive a cylinder rod or plunger 64, the plunger 64 being anchored to the plate 53. The plunger 64 is part of a conventional piston mechanism 65 which may be either pneumatically or hydraulically actuated to advance the carriage along the rods 58, thus to advance the aforementioned needles or cannulas to a position in which the needles telescopically encircle the aforementioned posts 28.

Attached to the frame member 48 by means of a supporting block 66 is a generally rectangular cage 70. Affixed to the cage 70 is an air motor 80 having respective inlet and outlet ports 81 and 83 to which appropriate hoses, not shown, are connected. The air motor 80, which is of conventional design, operates to apply a torque to a threaded shaft 82 which traverses the cage 70. The air motor is a reversible motor whose direction of operation is controlled by conventional control circuitry to accomplished the purposes to be described.

Threadedly engaged to the shaft 82 is a traveling, interiorly threaded nut 84 having an outwardly projecting slide member 86. The slide member 86 is trapped between spaced apart guide plates 88 which are affixed to the cage 70 and extend between end plates 90 and 92. Collars 94 and 96 encircle reduced diameter unthreaded extensions of the threaded shaft 82. Both of the collars 94 and 96 are anchored to the staft 82 by transversely extending dowel pins 98 and 100.

Figure 7:
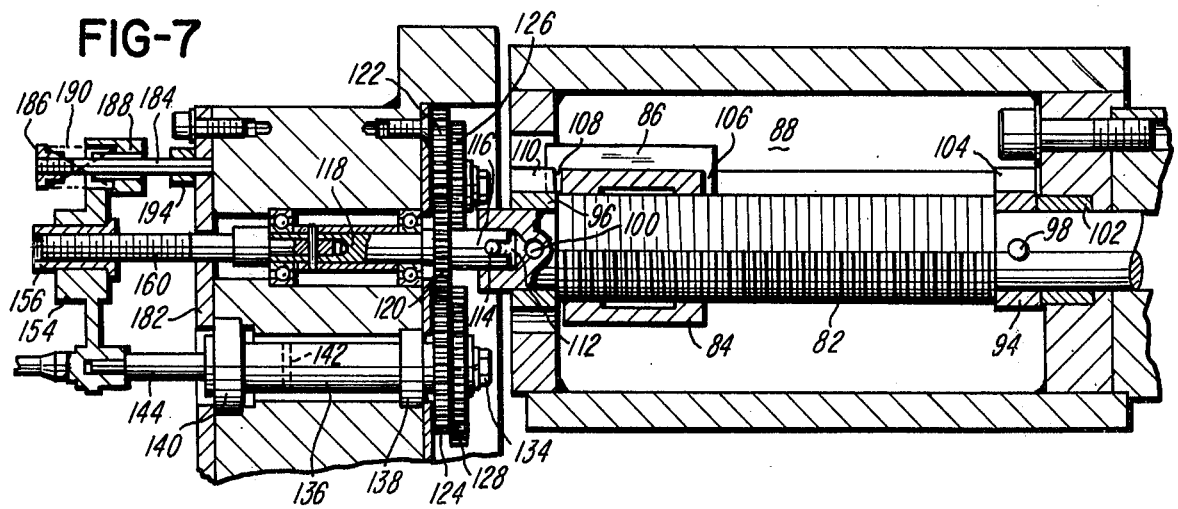
FIG. 7 is an enlarged and fragmentary section view taken along the line 7—7 of FIG. 5.

Referring to the right end of the shaft 82 as it appears in FIG. 7, the shaft receives bearing support within the end plate 92 by means of a sleeve bearing 102. The collar 94, being pinned to the shaft 82, rotates with the shaft 82 and has an outwardly projecting lug or dog 104 adapted to butt against an abutment 106 formed integrally on the nut 84. Bearing in mind that the nut 84 is restrained against rotation and the collar 94 is permitted to rotate, a rotation of the shaft 82 in the proper direction would advance the nut 84 toward the collar 94 until such time as the abutment 106 butts against the lug 104. This assures a positive and repeatable position of the shaft 82 at which the air motor 80 is caused to stall.

When the shaft 82 is rotated in the reverse direction by the air motor 80, the traveling nut 84 is caused to travel in the leftward direction as it appears in FIG. 7 until such time as an abutment 108 on the nut 84 engages a lug 110 projecting radially outwardly from the collar 96. Such engagement between the abutment 108 and the lug 110 again provides a positive stopping position at which the air motor 80 is stalled.

The foregoing features associated with the cage 70 enable the shaft 82 to execute a fixed number of rotations about its own axis in causing the nut 84 to traverse between the fixed limits established by the lugs 104 and 110. The nut 84 with its abutments 106 and 108 thus cooperates with the shaft 82 and its attached collars 94 and 96 having the lugs 104 and 110, respectively, as a rotation control means.

As appears in FIG. 7, the shaft 82 has a cylindrical end recess 112 traversed by a drive pin 114 and adapted for interlocking engagement to the slotted end 116 of a shaft 118, which is to be driven by the rotary movements of the shaft 82. Affixed concentrically to the shaft 118 is a driving gear 120 engaged to diametrically disposed driven gears 122 and 124, such engagement best shown in FIG. 6. The driven gears 122 and 124 have secondary driven gears 126 and 128 affixed in adjacent relation thereto as appears in FIG. 6. The secondary gears 126 and 128 are sized to mesh with tertiary driven gears 130 and 132.

Figure 6:
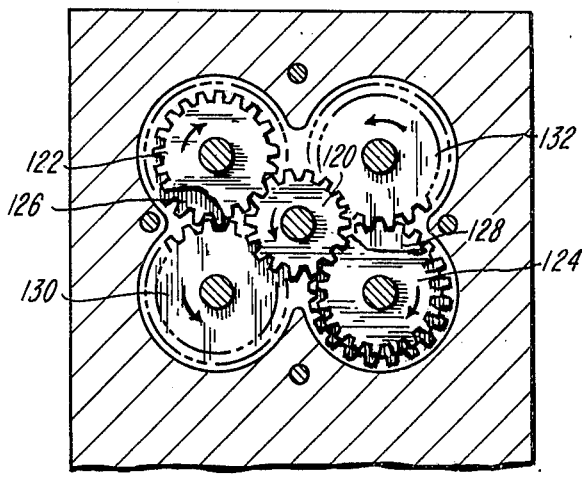
FIG. 6 is a section view taken substantially along the line 6—6 of FIG. 4.

As appears in FIG. 6, the driven gears 122, 124, 130 and 132 form a cluster of four gears assembled about the driving gear 120. Due to the arrangement of the gears, the gears 122 and 124, both of which are directly driven by the driving gear 120, will rotate in the same direction. Thus if the driving gear is rotating in the counterclockwise direction as it appears in FIG. 6, each of the driven gears 122 and 124 will rotate about their respective axes in the clockwise direction. The driven gears 130 and 132, being tertiary gears driven by the secondary gears 126 and 128, will rotate in an opposite direction, i.e., counterclockwise direction, about their respective axes. Thus if the aforementioned gears 122 and 124 are both rotating clockwise about their respective axes, the tertiary gears 130 and 132 will be driven equiangularly, but counterclockwise, about their respective axes.

As appears in FIG. 7, the gears 124 and 128, which are assembled adjacently for rotation about a common axis, are secured by a threaded fastener 134 to a hollow, internally threaded transmission shaft 136 supported by bearings 138 and 140 within the housing 40. The transmission shaft 136 is traversed by a dowel pin 142, which also traverses a bifurcation in a driven shaft 144. There is thus a direct torque transmission from the driving gear 120 through the driven gear 128 to the shaft 144. In similar fashion, each of the other gears 122, 130 and 132 are drivingly affixed to bifurcated output shafts analogous to the shaft 144. Due to the bifurcations in the shafts 144, each shaft 144 is free to slide axially in its transmission shaft.

Each of the several output shafts, all of which are equivalent to the shaft identified by the reference number 144, has one of the cannulas previously described by the reference numbers 42a, 42b and 42c fixed to a reduced end of the shaft by means of a set screw 146. The cannulas 42a, 42b, 42c and 42d appear in an end view in FIG. 5. Each of the cannulas has a recessed channel encircling the cannula to interfit a notched corner 150 formed in a caging plate 152, which assures that the four shafts 144 will travel axially in unison. The caging plate 152 has a generally rectangular shape in plan view as it appears in FIG. 5 and has it corners partially removed to provide for the notched corners identified with the reference number 150. The caging plate 152 has a centrally disposed and integrally formed socket 154, which slideably receives a bushing 156 having an enlarged shoulder 158. The bushing 156 is internally threaded to receive a threaded shaft 160. The shaft 160 enters the housing 40 where the shaft is enlarged to form a shoulder 162 effective for trapping a bearing 164. The shaft 160 continues in reduced diameter through the bearing 164 to threadedly engage within an internally threaded bore 166 located in the shaft 118 to which the driving gear 120 is integrally attached. The shaft 118 receives bearing support from the aforementioned bearing 164 and a second bearing 170 spaced from the bearing 164. The two bearings 164 and 170 are spaced apart by a sleeve 172, which encircles the shaft 118 between the bearings 164 and 170, the bearing 170 being trapped between the sleeve 172 and a shoulder 174 formed on the shaft 118. The shaft 118 is keyed to the shaft 160 by a dowel pin 180, which passes through the aforementioned sleeve 172. As a consequence of the foregoing construction, it can be noted that the shaft 160 is positively driven rotationally so as to follow the rotary movements of the shaft 82, but is restrained from any axial movements.

Referring to the description of the shaft 82 and the nut 84 which travels thereon, it will be recalled that the shaft 82 has a fixed number of revolutions permitted in one direction of its rotation and an equal number of opposite revolutions permitted in the opposite direction of its rotation. Due to the presence of the dowel pins 114 and 180, this same number of revolutions in either direction is transmitted to the shaft 160.

The bushing 156 is keyed in the socket 154 by a rectangular cross-section. The aforementioned caging member 152 is keyed to the needles 42a, 42b, 42c and 42d so as not to rotate about its own axis. Accordingly, the rotary movements of the shaft 160 threadedly engaged to the bushing 156 cause the bushing 156 to travel axially either toward the housing 40 or away from the housing 40, depending upon the direction of rotation imparted to the shaft 160. It will be noted, however, that the axial movements of the bushing 156 are not necessarily transmitted to the caging member 152 due to the sliding connection therebetween.

Press-fitted into the left-hand face 182 of the housing 40 are a pair of shafts 184. The shafts 184 are disposed on diametrically opposite sides of the threaded shaft 160 and are spaced outwardly from such shaft. Referring to FIG. 4, each of the shafts 184 is threaded at its outer end to threadedly support a collar member 186. Formed integrally with the caging member 152 are socket members 188, which cooperate with the collars 186 to entrap compression springs 190 encircling the shafts 184. Sleeve bearings 192 press-fitted in the socket members 188 assure that the caging member 152 will have relatively frictionless axial travel on the shafts 184. Fitted on each shaft 184 between the housing 40 and the caging member 152 is a tubular spacer 194.

Accordingly, there are two of the shafts 184 press-fitted in the end face 182 of the housing 40 on diametrically opposite sides of the shaft 160; and each of the shafts 184 is assembled with a collar 186 and a spring 190 coacting with a socket portion 188 of the caging member 152 to bias the caging member toward the housing 40; and each of the shafts 184 is also surrounded by a spacer 194.

It can be noted in FIG. 4 that the compression springs 190, only one of which appears in FIG. 4, act to bias the caging member 152 toward the housing 40 but are limited in such effort by the shoulder 158 formed on the bushing 156, which is threadedly engaged to the shaft 160. As a practical consequence, the springs 190 act always to bias the caging member 152 toward the housing 40, but the ultimate advance of the caging member 152 toward the housing 40 is limited usually by the shoulder 158 located on the bushing 156.

It will be noted, however, that the spacers 194 provide a positive limit to the advance of the caging member 152 toward the housing 40, such limit occurring when the socket portions 188 of the caging member 152 contact the spacers 194 disposed on diametrically opposite sides of the shaft 160. It will be noted also that when this positive stop comes into play, a continued rotation of the shaft 160 such as would allow an advance of the bushing 156 toward the housing 40 will not interfere with such positive stop.

Directing attention to the cannulas 42a, 42b, 42c and 42d, each of which as already described is affixed to a separate shaft 144, it will be noted in FIG. 8 that the cannulas, which are tubular, are tapered axially to forward noses 196 and each have a somewhat helical slit 198 axially traversing the forward nose 196. The end face 200 of the nose 196 is also helically shaped between the leading and trailing edges of the slit 198, with the consequence that the end face 200 forms a hook 202 at the leading edge of the slit 198 which is axially spaced on the trailing edge 204 of the slit 198. Placed in FIG. 9 is an arrow 206 which illustrates the direction of rotation that will be imparted to the cannula 42b there illustrated for accomplishing purposes of the present invention.

This direction of rotation corresponds to the direction of rotation shown in FIG. 2 for a wrapping motion of the lead wire 32b about the post 28, which is immediately adjacent the lead wire. Such direction of rotary motion is accordingly the direction of rotary motion that must be imparted to the driven gear 122 illustrated from an opposite direction in FIG. 6. Thus the assembly of gears illustrated in FIG. 6 is so arranged as to drive the driven gear 122 in the clockwise direction as it appears in FIG. 6. Inasmuch as the driven gear 122 is meshed with the previously described driving gear 120, it follows that the driving gear 120 should be rotated in the counterclockwise direction as it appears in FIG. 6 to achieve the direction of winding for the lead wire 32b indicated in FIG. 2. It will be noted, of course, that when the driving gear 120 is being rotated in the counterclockwise direction, the indicated directions of rotation for wrapping each of the wires 32a, 32b, 32c and 32d, as indicated in FIG. 2, are achieved. Of course, it will be understood that the cannulas for wrapping the wires 32b and 32c will be formed as indicated in FIGS. 8 and 9. The cannulas for wrapping the wires 32a and 32d will be similarly formed to the cannula 42b illustrated in FIGS. 8 and 9 but will be designed for rotation in the opposite direction. Thus the end face 200 for such cannulas, as well as the helically formed slit 198 for such cannulas, will be formed oppositely (helical formation but pitched in the opposite direction) so as to produce a hook suitable for hooking a wire such as the wire 32a shown in FIG. 2 by a clockwise rotation of the cannulas.

As a starting condition, one can assume that the traveling nut 84 is to the far left as it appears in FIG. 7. One can further assume that the threads of the traveling nut 84 and of the shaft 82 are so slanted that when the shaft 82 is rotated to advance the traveling nut 84 to the right as it appears in FIG. 7, the drive gear 120, which is directly driven by the shaft 82, will be rotated in the clockwise direction as it appears in FIG. 6. The threads engaging the shaft 160, which is directly driven by the shaft 82, and the threads of the bushing 156 will be slanted similarly to those of the shaft 82 so as to cause the bushing 156 to approach the housing 40 at the same time the traveling nut 84 recedes from the housing 40. Thus as all the cannulas 42a, 42b, 42c and 42d are being rotated in the preferred directions indicated in FIG. 3, thus to wind the lead wires onto their adjacent posts over which the cannulas are telescoped, the bushing 156 is being drawn toward the housing 40 thus to allow the springs 190 to advance the caging member 152 as it appears in FIG. 4 toward the housing 40, thus to draw the cannulas away from the stator 12. It will be noted, however, that the cannulas 42a–d, while positively rotated, are not being positively driven axially away from the stator 12. Rather, the bushing 156 is being positively driven away from the stator 12 and the springs 190 are biasing the caging member 152 and thus the cannulas 42a–d away from the stator 12 at whatever speed will be accommodated by the general helical winding of the leads 32a–d onto the posts 28. Obviously, by an appropriate selection of the pitches for the threads on the shafts 82 and 160, together with compatible pitches for the traveling nut 84 and the threads in the bushing 156, a permissible rate of travel for the bushing 156 can be established wherein the motion of the bushing 156 toward the housing 40 can suitably accommodate a uniform winding of the lead wires about the posts 28.

More particularly, it is preferred in the practice of the present invention that the threads on the shaft 160 pull the bushing 156 toward the housing 40 at substantially the same rate as closely spaced convolutions of the lead wires are formed about the posts 28, at least during the initial wrapping of the wire about the posts.

The spacers 194 are so sized with respect to the posts 28 that when the buildup of lead wire wrapped about each of the posts reaches the end of each of the posts the socket members 188 associated with the caging member 152 will bottom against the spacers 194, thus to prevent a further approach of the caging member 152 toward the housing 40. When such bottoming occurs, it is preferred with fine wire that the traveling nut 84 has not yet reached the end of its travel and, accordingly, the shafts 82 and 160 will continue to rotate. The wire 32b is pulled out of the clamp 30 as the cannula 42b continues to rotate. Depending upon the composition of the wire being wound and the stiffness of the wire, the continued rotation of the cannula 42b is found most typically to cause a clean breakage of the wire adjacent the end of the post 28. If breakage does not occur, a pigtail formation such as illustrated at 208 in FIG. 11 forms due to the continued rotation of the cannula. With heavy wire, it is preferred that only a few turns of wire are wrapped onto the posts.

Whether the wires break or not, the air motor 80 ultimately causes the nut 84 to reach the limit of its travel to the right as it appears in FIG. 7. It will be understood, however, that the nut 84 does not actually reach the end of the cage 70. Rather, the nut 84 is restrained from further rotation as it approaches the right end of the cage 70 by reason of the abutment 104 engaging the lug 106 located on the collar 94. Since the collar 94 is fixed to the shaft 82 and the nut 84 is positively restrained from rotation, the engagement of the lug 106 by the abutment 104 brings about an abrupt termination of the rotary movement of the shaft 82 by stalling the air motor 80. For the same reasons, all rotation of the gears driven by the drive gear 120 is terminated and all rotation of the cannulas 42a–d is also terminated.

The actuator cylinder 65 is next energized to draw the carriage frame 48, 52 to the right as it appears in FIG. 3, thus disengaging the stator 12 by drawing the cannulas 42a–d away from the posts 28 being encircled thereby. When the cannulas are withdrawn the slit 198 in each of the cannulas allows the cannulas to freely slide off the wire theretofore being wrapped, it being unimportant whether pigtail formation had caused such wire to break. Should the wire have not broken at a convenient location, the pigtailed wires are severed by any suitable shearing device so as to cleanly cut any loose wire from the stator 12, thus leaving the stator 12 with outwardly extending posts surrounded by wire for later engagement in any suitable fashion by a means to supply electrical power to the wires remaining on the posts.

During a convenient idle time in the machine operating cycle, a supply of air to the air motor 80 is reversed causing the air motor to rotate the shaft 82 in a direction which will cause the nut 84 to travel to the left as it appears in FIG. 3. As the nut travels to the left, the rotation of the air motor 80 is ultimately interrupted by engagement of the abutment 108 on the nut 84 with the lug 110 on the collar 96. During such reverse motion of the nut 84, the cannulas 42a–d are also reversely rotated, but this poses no problem since the wires previously hooked by the cannulas have been separated from the cannulas.

An important feature of the present invention is that when the abutment 108 engages the lug 110, the cannula 42a–d have been returned to a precise starting positions which will enable the hooks 202 on each of the cannulas to engage new wires 32a–d located on a new stator in a favorable manner. To more particularly illustrate such favorable manner, it is important that the hooks 202 on the cannulas are initially located immediately adjacent the respective wires 32a–d where only a few degrees of rotation such as 20° of rotation will cause the hook to engage the wire in the manner illustrated in FIG. 8. This is a condition which is preliminarily satisfied by adjustment of the set screws 146 to set the cannulas 42a–c to the appropriate starting angles before a production run is commenced.

FIGS. 8, 9 and 10 progressively illustrate the buildup of convolutions of the lead termination wire 32b on a post 28. The orderly arrangement of adjacent convolutions is promoted in accordance with the present invention by an appropriate selection of the pitch for the threads in the threaded shaft 140, thus to cause the bushing 156 to advance to the right as it appears in FIG. 7 at a rate which allows the springs 190 to move the caging member 152 to the right as appears in FIG. 7 at a speed which is sufficient to allow a smooth layering of the coil wire being terminated. It will be understood that while the cannula 42b is being specifically illustrated, the other cannulas 42a, 42c and 42d will layer the wire in a similar fashion although, of course, the cannulas 42a and 42d will be rotated in an opposite direction.

While the present invention has been described as producing a smooth layering of the lead wires being terminated at the posts 28, it will be understood that the pitch of the threads in the shaft 140 is subject to considerable variation without departure from the scope of the present invention. Thus it is unimportant whether the successive convolutions of the lead wire being terminated lie immediately adjacent one another as shown or are spaced apart in a looser type of winding.

As shown in FIG. 11, the traverse of the cannulas may carry the lead wires being wound on the posts 28 beyond the ends of the posts where the lead wires may form pigtails 208 for reasons previously described.

FIG. 12 illustrates the winding of a wire 210 about a post 212, and it can be noted that the wire 210 is substantially larger in diameter in relation to the post 212 than was the case with the wire 32b in relation to the diameter of the post 28. FIG. 12 thus illustrates that by appropriate sizing of the cannulas heretofore described, the pitch in the threads of the shaft 140 and, if necessary, the diameter of the posts on which the wires are to be wound, the principles of the present invention may be applied to a wide variety of wire and post sizes.

When winding a wire having a relatively large diameter such as illustrated in FIG. 12, a pigtailing which would cause the wire to break will rarely occur; and it is uniformly necessary to sever the ends of the wires being terminated as illustrated in FIG. 13 by the broken line 214. Such severance of the wires being terminated is conveniently accomplished with a wire cutting or snipping tool which is sturdy enough to simultaneously sever both the post 212 and the wire 210, thus providing a clean termination of both the wire and the post at any convenient location along the length of the post.

Although the preferred embodiments of this invention have been described, it will be understood that various changes may be made within the scope of the appended claims.

I claim:

1. Apparatus for terminating a wire extending from a coil wound about a flux-carrying member on post means projecting outwardly from a wire retainer mounted on said flux-carrying member, said apparatus comprising, in combination, clamp means disposed remotely from said coil for yieldably supporting said wire, said wire extending from said clamp means and alongside said post means to said coil, hook means disposed adajacent said post means for hooking said wire, and means for rotating said hook means about the axis of said post means to engage said hook means with said wire and with continued rotation to cause said hook means to wind said wire about said post means, said means for rotating said hook means causing said hook means to hook wire between said clamp means and said coil, said means for rotating said hook means moving said hook means in a direction which tends to increase the tension in said wire along its length between said coil and said clamp means, said clamp means adapted to yield to such increased tension.

2. Apparatus for terminating a wire extending from a coil wound about a flux-carrying member on post means projecting outwardly from a wire retainer mounted upon said flux-carrying member, said apparatus comprising, in combination, clamp means for yieldably supporting said wire adjacent said post means, hook means disposed adjacent said post means for hooking said wire, means for rotating said hook means about the axis of said post means to engage said hook means with said wire and with continued rotation to cause said hook means to wind said wire about said post means, means caging said hook means, spring means biasing said caging means axially with respect to said post means for traversing said hook means along said post means as said hook means winds said wire about said post means.

3. The apparatus of claim 2 further including limit means to limit the movement of said caging means and said hook means in response to said bias means, and means responsive to said means for rotating said hook means to traverse said limit means axially with respect to said post means.

4. The apparatus of claim 3 including spacer means limiting the traverse of said hook means and said caging means independently of said limit means.

* * * * *

UNITED STATES PATENT OFFICE
CERTIFICATE OF CORRECTION

PATENT NO. : 4,000,764
DATED : January 4, 1977
INVENTOR(S) : Arthur C. Reiger, Jr.

It is certified that error appears in the above-identified patent and that said Letters Patent are hereby corrected as shown below:

Col. 3, lines 34 and 35, "member" should be ---members---.
Col. 3, line 58, "accomplished" should be ---accomplish---.
Col. 3, line 66, "staft" should be ---shaft---.
Col. 5, line 17, "it", second occurrence, should be -- its --.
Col. 8, line 58, "positions" should be ---position---.
Col. 10, line 16, "adajacent" should be ---adjacent---.
Col. 10, line 22, after "hook" (second occurrence) insert ---said---.

Signed and Sealed this

Twenty-eighth Day of June 1977

[SEAL]

Attest:

RUTH C. MASON
*Attesting Officer*

C. MARSHALL DANN
*Commissioner of Patents and Trademarks*